United States Patent Office 3,541,392
Patented Nov. 17, 1970

3,541,392
INTERRUPTION MONITOR WITH DELAY DISCONNECTING AND RECONNECTING MEANS
Donald Paul Vargo, Nutley, and Gunter Jerry Gessner, Fairfield, N.J., assignors to The Bendix Corporation, a corporation of Delaware
Filed Sept. 30, 1968, Ser. No. 763,894
Int. Cl. H02h 3/24, 47/18
U.S. Cl. 317—31  8 Claims

ABSTRACT OF THE DISCLOSURE

A circuit for monitoring a power supply and controlling a relay connecting the power supply to a device energized thereby. The relay is energized by the power supply through a silicon controlled rectifier and a transistor which is maintained conductive by the power supply. A charged capacitor sustains relay energization and transistor conduction during a power supply failure. A Zener diode causes the transistor to cut off when the capacitor discharges to a voltage corresponding to a specified duration after the power failure thereby de-energizing the relay and disconnecting the device from the power supply. Upon return of power an uncharged capacitor is controllably charged through a resistor. A unijunction transistor detects when the capacitor is charged to a voltage corresponding to a specified delay and provides a pulse to trigger the silicon controlled rectifier into conduction thereby re-energizing the relay and reconnecting the device to the power supply after a specified delay.

BACKGROUND OF THE INVENTION

Field of the invention

This invention relates to power supply monitors for detecting power interruptions and more particularly to a monitor for disconnecting a device upon power interruptions of a specified duration and delaying reconnection until a fixed time interval after power is restored.

Description of the prior art

There are two general types of power monitors, high current and low voltage detection types. In many types of equipment it is desirable that the monitor automatically reset a predetermined time after a failure condition has ceased to exist. It is also desirable that there be a delay in those devices that detect low voltage so that a short duration intermittent failure will not trip the monitor.

In the prior art some devices had turn off delays and others had reset delays; however, there were no devices combining both turn off and reset delays as is done in the present invention.

Most prior are devices use standard resistor-capacitor networks for the time delay as in Mahoney, U.S. Pat. No. 3,198,989. However, these devices do not provide for complete discharge of a capacitor and leave a residual charge causing an error in the subsequent delay. The present invention provides for complete discharge of the capacitor after the delay.

Heretofore a load current was passed through either a silicon controlled rectifier or a transistor depending upon whether a turn off or reset delay was desired. Silicon controlled rectifiers are easily triggered into the on or conducting state, therefore they are usually used in devices requiring a turn on delay. Transistors are not rendered conducting as easily or as accurately as silicon controlled rectifiers. A pulse cannot be used because it is only momentary and will not sustain the conduction of the transistor. However, transistors are easily rendered cut off while silicon controlled rectifiers present problems in that they continue to conduct till the load current is reduced below the holding current of the silicon controlled rectifiers. Special provisions must be provided to cut off silicon controlled rectifiers at the required turn off time. Mahoney, U.S. Pat. 3,198,989 uses a discharging capacitor to commutate a silicon controlled rectifier. Myers, U.S. Pat. No. 3,286,131 uses a coil to develop a negative current which renders the silicon controlled rectifiers cut off. Both of these methods require large and expensive components for their implementation.

The present invention provides a simplified system by utilizing both a silicon controlled rectifier and a transistor to conduct the load current. By uniquely combining these two devices the invention utilizes the advantages of both devices and eliminates their disadvantages. The accurate turn on feature of the silicon controlled rectifier and the easy cut off feature of the transistor are utilized.

SUMMARY OF THE INVENTION

The present invention contemplates a power interruption monitor capable of distinguishing between durations of power interruptions and disconnecting a using device when the interruption is of a specified duration and reconnecting the using device after a specified period after the power is restored.

During normal operation the circuit passes a load current through silicon controlled rectifier, a transistor and a relay coil energizing the relay which connects a using system. A first capacitor is fully charged and is used to temporarily sustain the load current in the event of a power interruption. Should a power interruption occur, the first capacitor will discharge through the silicon controlled rectifier, transistor and relay at a controlled rate while providing base current to the transistor through a Zener diode. After a specified duration the first capacitor discharges to the Zener voltage of the Zener diode, the base current to the transistor is cut off rendering the transistor nonconductive and thereby de-energizing the relay and disconnecting the using device. Should the power interruption not last for the specified duration, the capacitor will not discharge below the Zener voltage and the relay will remain energized.

Upon return of power the base current for the transistor is present but the silicon controlled rectifier is cut off preventing the load current from exciting the relay. A second uncharged capacitor is controllably charged through a resistor and after a specified period its voltage reaches the firing voltage of a unijunction transistor. The unijunction transistor provides a pulse to trigger the silicon controlled rectifier into conduction. The silicon controlled rectifier passes current to the relay which reconnects the using device and shorts the second capacitor providing complete discharge for the next time delay.

One object of the invention is to provide a power interruption monitor for disconnecting a using device.

Another object of the invention is to provide a delay in the detection device so that only interruptions of specified duration will cause the using device to be disconnected.

Another object of this invention is to provide a delay in reconnecting the using device to provide time for resynchronization of the using device.

Another object of this invention is to provide accurate delay times.

DESCRIPTION OF THE INVENTION

Figure 1:
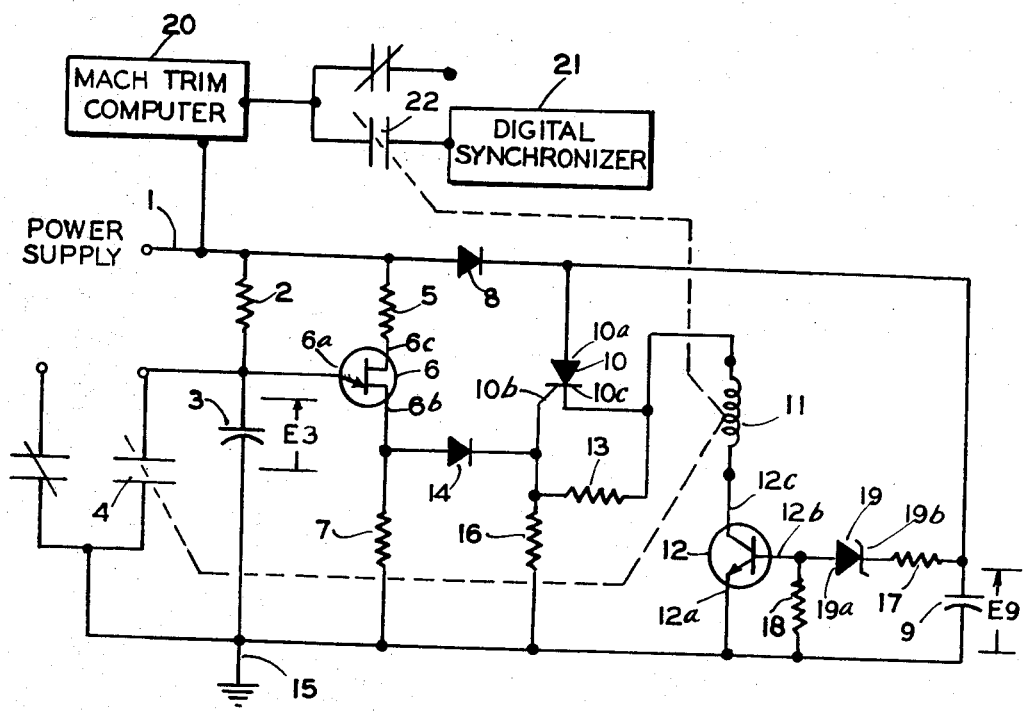
FIG. 1 is a schematic circuit diagram showing one embodiment of the present invention.

Referring to FIG. 1 there is shown one embodiment of the invention. A resistor 2 and capacitor 3 are connected in series across a power supply 1 with the resistor 2 connected to the positive terminal of the power supply 1. Relay contacts 4 are connected across the capacitor 3. Also connected across power supply 1 is the series combination of a resistor 5, a unijunction transistor 6, and a resistor 7. Unijunction transistor 6 has an element 6a connected to resistor 2 and capacitor 3, an element 6c connected to resistor 5 and an element 6b connected to resistor 7. A diode 8 and capacitor 9 are connected in series across the power supply 1 having the anode of diode 8 connected to the positive terminal of the power supply and the cathode connected to the capacitor 9. Connected across capacitor 9 is the series combination of a silicon controlled rectifier 10, a relay coil 11 and a transistor 12, the silicon controlled rectifier having an anode 10a connected to the positive plate of capacitor 9 and a cathode 10c connected to the relay coil 11. The transistor 12 has a collector 12c connected to relay coil 11. A diode 14 connects element 6b of unijunction transistor 6 to a gate 10b of silicon controlled rectifier 10, the cathode of diode 14 being connected to the gate 10b. A resistor 13 connects gate 10b to cathode 10c of silicon controlled rectifier 10. Gate 10b is connected to a ground bus 15 by a resistor 16. Also connected across capacitor 9 is a series combination of a resistor 17, a Zener diode 19 and a resistor 18, resistor 17 connecting a cathode 19b of Zener diode 19 to the positive plate of capacitor 9. A base element 12b of transistor 12 is connected to an anode element 19a of Zener diode 19. A Mach Trim Computer 20 is connected to power supply 1. A Digital Synchronizer 21 is connected to the Mach Trim Computer 20 by relay contacts 22.

OPERATION OF THE INVENTION

Figure 2:
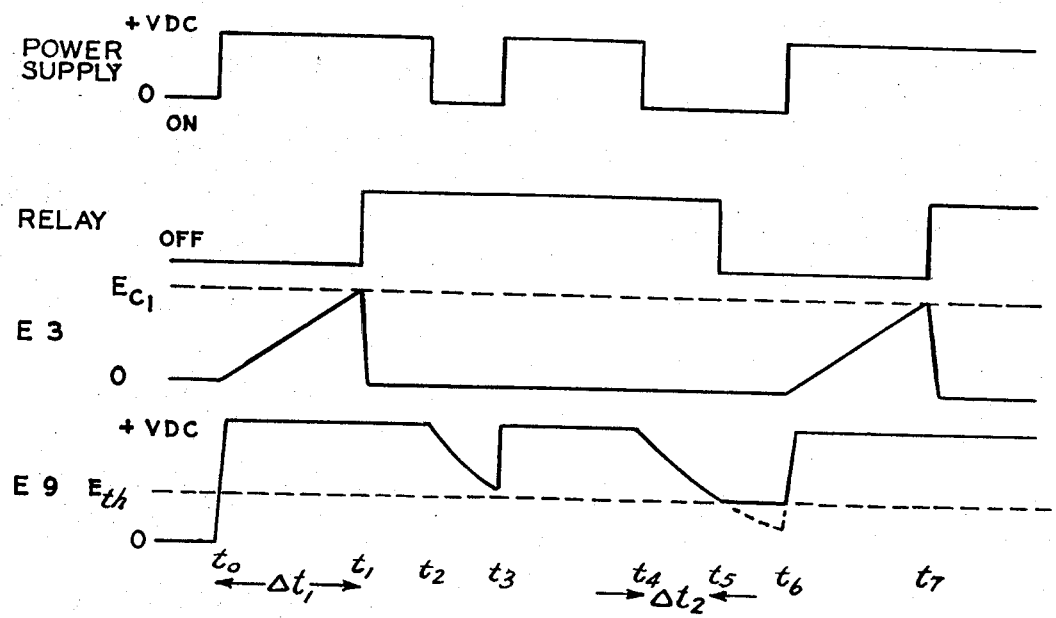
FIG. 2 shows the time relationship of various voltage levels in the embodiment of FIG. 1.

Referring to FIGS. 1 and 2. Upon initial application of power at time $t_0$ capacitor 9 charges rapidly through diode 8 while capacitor 3 charges at a controlled rate through resistor 2. Capacitor 3 charges to voltage $E_{c1}$ at time $t_1$ at which voltage unijunction transistor 6 generates a pulse which is passed by diode 14 to gate element 10b of silicon controlled rectifier 10. Silicon controlled rectifier 10 is triggered into conduction by the pulse from unijunction transistor 6. The voltage on capacitor 9 is greater than the Zener voltage of Zener diode 19 therefore Zener diode 19 passes current through resistor 17 to the base element 12b of transistor 12. The base current is sufficient to allow saturation of transistor 12. Relay coil 11 is then energized by the current through silicon controlled rectifier 10 and transistor 12 and the normally open contacts 4 and 22 are closed discharging capacitor 3 and connecting the digital synchronizer 21 to the Mach Trim Computer 20.

Should a power interruption occur at time $t_2$ relay coil 11 will remain energized by the discharge current of capacitor 9. If the power is restored at time $t_3$ before the capacitor voltage E9 decays to $E_{th}$, equal to the sum of the Zener voltage of Zener diode 19, the voltage drop across resistor 17 and the $V_{be}$ drop of transistor 12, capacitor 9 will recharge and no circuit interruption will occur. If the power again fails at $t_4$ and remains off beyond $t_5$ the voltage E9 will decay below $E_{th}$ and the base current to transistor 12 will be interrupted when the Zener diode 19 cuts off. Transistor 12 will turn off and relay 11 will be de-energized disconnecting the Digital Synchronizer 21 from the Mach Trim Computer 20 and removing the short across the capacitor 3. When power is restored at $t_6$ capacitor 3 will recharge and when its voltage reaches $E_{c1}$ at $t_7$ the synchronizer 21 will be reconnected to the Mach Trim Computer 20 and capacitor 3 shorted.

The initial turn on delay of delta $t_1$ is controlled by the selection of resistor 2 and capacitor 3 while the duration of an interruption needed to turn off the circuit, delta $t_2$, is selected by the choice of Zener diode 19, resistor 17 and capacitor 9.

The device constructed according to the invention detects power interruptions and after a specified duration disconnects the using device and reconnects the using device after an accurate delay upon restoration of power allowing the device to resynchronize before being reconnected.

What is claimed is:

1. A circuit for monitoring a power supply comprising:
   first sensing means connected to the power supply for detecting power failures of a specified duration;
   second sensing means connected to the power supply for detecting the return of power and providing a response after a specified delay;
   switch means; and
   control means connected to and responsive to the first sensing means for operating the switch means upon detection of a power failure of a specified duration and connected to and responsive to the second sensing means for again operating the switch means after a specified delay upon return of power.

2. A circuit as described in claim 1, in which the first sensing means comprises:
   a capacitor arranged to discharge at a controlled rate through the control means to delay operation of the switch means in the event of a power failure; and
   voltage sensing means connected to the capacitor for detecting capacitor discharge to a specified voltage.

3. A circuit as described in claim 2, in which the voltage sensing means comprises a Zener diode and a resistor.

4. A circuit as described in claim 1, in which the second sensing means comprises:
   a capacitor and a resistor connected in series across the power supply; and
   a voltage level detector connected to the capacitor and resistor for providing a response when the capacitor is charged to a specified voltage.

5. A circuit as described in claim 4, in which the voltage level detector comprises a unijunction transistor.

6. A circuit as described in claim 4, having discharge means connected across the capacitor and responsive to the level detector for discharging the capacitor after a specified delay.

7. A circuit as described in claim 1, in which the control means comprises:
   an electroresponsive device for operating the switch means;
   a transistor connecting the power supply to the electroresponsive device and responsive to the first sensing means for controlling de-energization of the electroresponsive device as a result of a power failure of a specified duration detected by the first sensing means; and
   a silicon controlled rectifier connecting the power supply to the electroresponsive device and responsive to the second sensing means for controlling energization of the electroresponsive device to operate the switch means at a specified time after power is restored.

8. A circuit of the kind described comprising:
   a power supply;
   a device energized thereby;
   switching means for connecting and disconnecting the device to and from the power supply; and
   electroresponsive device connected to the power supply for controlling the switching means;
   a first capacitor arranged to discharge at a controlled rate through the electroresponsive device to delay operation of the switching means in the event of a power failure;
   voltage sensing means connected to the first capacitor for sensing when the first capacitor is discharged to a specified voltage;

a second capacitor connected to the power supply;

a resistor connected in series with the second capacitor for controlling the rate of charge of the second capacitor upon return of power;

a voltage level detector connected to the second capacitor and resistor for providing a response when the second capacitor is charged to a specified voltage;

discharge means connected across the second capacitor and responsive to the voltage level detector for discharging the second capacitor after a specified delay;

a transistor connecting the power supply to the electroresponsive device and responsive to the voltage sensing means for controlling de-energization of the electroresponsive device as a result of a power failure detected by the first sensing means to operate the switching means; and a silicon controlled rectifier connecting the power supply to the electroresponsive device and responsive to voltage level detector for controlling energization of the electroresponsive device to operate the switching means a specified time after power is restored.

References Cited

UNITED STATES PATENTS

| | | | |
|---|---|---|---|
| 2,982,885 | 5/1961 | Becker | 317—142 |
| 3,078,392 | 2/1963 | Bollesen. | |
| 3,155,879 | 11/1964 | Casey et al. | 317—142 X |
| 3,406,295 | 10/1968 | Corey | 317—142 X |

JAMES D. TRAMMELL, Primary Examiner

U.S. Cl. X.R.

307—126; 317—33, 36, 142